Feb. 7, 1967 N. S. SULOWAY 3,303,290

SIGNALING ARRANGEMENTS EMPLOYING PIEZOELECTRIC DEVICES

Filed Jan. 2, 1964

INVENTOR.

NAOMI S. SULOWAY

BY C. A. Gulbrandsen

ATTY.

3,303,290

SIGNALING ARRANGEMENTS EMPLOYING PIEZOELECTRIC DEVICES

Naomi S. Suloway, Chicago, Ill., assignor to Automatic Electric Laboratories, Inc., Northlake, Ill., a corporation of Delaware Filed Jan. 2, 1964, Ser. No. 335,017
5 Claims. (Cl. 179—90)

This invention relates to voice frequency signaling systems and in particular to piezoelectric apparatus for generating electrical signals, for example signaling arrangements employed in telephone systems.

Piezoelectric transducers in which energy of motion is converted to electrical energy are well known in the phonograph industry where they are used to convert the mechanical vibrations of a disc recording into electrical vibrations. Another use of piezoelectric transducers is described by N. S. Suloway and J. M. Bernstein in their copending patent application Serial No. 231,322, filed October 15, 1962, now United States Patent 3,218,636, and assigned to the same assignee as the present invention, wherein a ring of piezoelectric material is excited by an electrical signal converting electrical energy to a vibratory mechanical energy for activating the gongs of a signaling device.

In the present invention piezoelectric transducers are employed as tone generators for both dialing and for party identification. It should be noted, however, that the signaling arrangements described herein are by no means limited to telephone system applications.

Tone generators for generating a plurality of frequencies in general have heretofore comprised a plurality of resonant circuits, or some sort of electrical crosspoint network as a resonant circuit selective scheme, and an amplifier for building up oscillations of the resonant circuit and impressing them on the transmission line. One such arrangement is described by L. A. Meacham in his U.S. Patent 3,064,084, "Telephone Substation Apparatus." A disadvantage of these types of arrangements is that they require positive electrical contacts, and consequently, precision and reliable contact closing apparatus in the dialing arrangement. The present invention employs piezoelectric transducers which are mechanically shocked into generating electrical signals which overcomes the above disadvantage by eliminating the need for electrical contact closures.

According to one aspect of the invention, party identification may be established using a tuned piezoelectric element in conjunction with the hookswitch plunger. A piezoelectric element mounted in the subset housing generates an identity tone when the telephone is placed in the off hook condition. Advantageously, this method of identification is characterized by the great number of frequencies which may be generated.

According to another aspect of the invention, a plurality of piezoelectric transducers are employed in conjunction with push button apparatus to provide a voice-frequency calling arrangement.

It is the object of the invention to provide improved signaling arrangements.

It is a further object of the invention to provide improved signaling arrangements employing piezoelectric transducers for generating tone signals.

Another object of the invention is to provide a push button dialing arrangement which obviates the need for electrical contact closures.

It is a further object of the invention to provide an improved party identification arrangement.

Other objects and features not specifically described will become apparent and the invention will best be understood from the following description taken in conjunction with the accompanying drawings.

Figure 1:
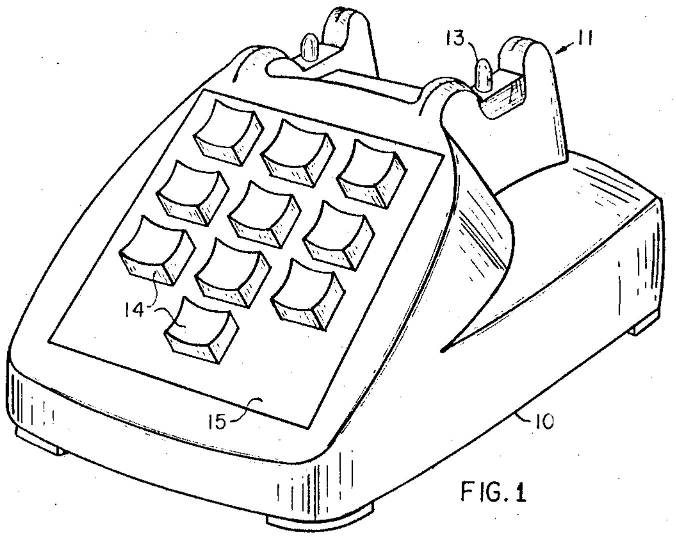
FIG. 1 is a pictorial representation of a push button telephone subset.

Referring to FIG. 1, a push button telephone subset is shown having a housing 10, a cradle 11 for receiving a handset 12 (shown only in FIG. 6), a hookswitch plunger 13, a plurality of push buttons 14, and a face plate 15.

Figure 2:
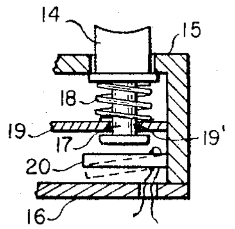
FIG. 2 is a schematic representation of a push button assembly which may be employed in FIG. 1.

FIG. 2 describes a push button assembly including a push button 14 which extends through the face plate 15, a base plate 16, and a center plate 19 having an aperture 19' therein. A spring 18, which surrounds an elongated push button portion 17, bears on the bottom side of push button 14 and the top side of plate 19 and provides a restoring force when push button 14 is tapped. Piezoelectric transducer 20 is affixed to the vertical surface of face plate 15 as a cantilever. Transducer 20 also has two electrical connections which may extend through an aperture in base plate 16.

Figure 3:
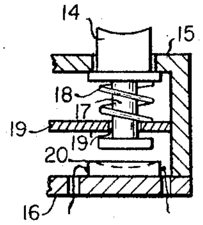
FIG. 3 is a schematic representation of another push button assembly which may be employed in FIG. 1.

FIG. 3 is similar to FIG. 2; however, the piezo-electric transducer 20 is affixed to base plate 16 and will be compressed when push button 14 is tapped.

Figure 4:
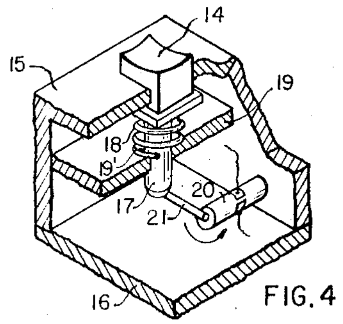
FIG. 4 is a schematic representation of another push button assembly which may be employed in FIG. 1.

FIG. 4 is similar to FIGS. 2 and 3; however, piezoelectric transducer 20 is affixed to a vertical side wall of base plate 15. Member 21 is affixed to the end of the transducer 20 and when push button 14 is tapped cooperates with the elongated portion 17 to apply a torsional force to the transducer 20.

Figure 5:
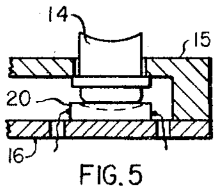
FIG. 5 is a schematic representation of another push button assembly which may be employed in FIG. 1.

FIG. 5 is a much simpler push button arrangement that is somewhat similar to FIG. 3 with the exception that elements 17, 18 and 19 are not required. The push button 14 bears directly on the piezoelectric transducer 20 and transmits a mechanical shock to the transducer when push button 14 is tapped.

Figure 6:
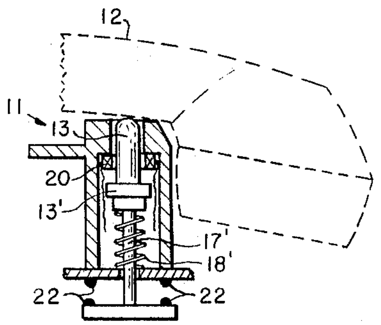
FIG. 6 is a schematic representation of a telephone cradle assembly which may be employed in FIG. 1.

FIG. 6 shows a hookswitch plunger arrangement for transmitting a supervisory tone to the central office upon removal of the handset 12 from the cradle assembly 11. This arrangement also has an elongated portion 17' which is an extension of the plunger 13 and a spring 18' which drives plunger 13 into contact with transducer 20 when the handset 12 is removed from the cradle. This assembly also shows contacts 22 which may be used to complete connections in other portions of the subset.

Figure 7:
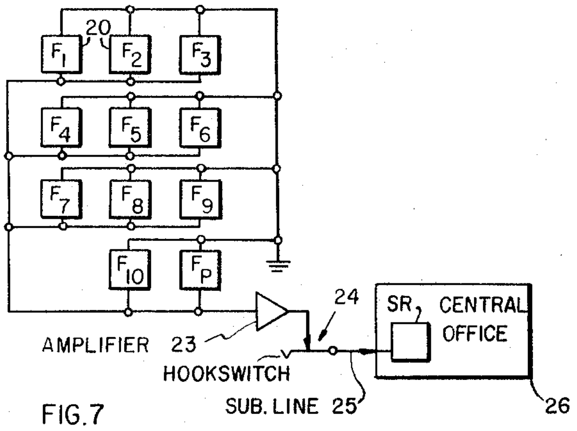
FIG. 7 is a circuit diagram of the signaling portion of a telephone subset in accordance with the principles of the invention.

FIG. 7 describes the circuit arrangement of the signaling portion of the subset according to the invention. A group of piezoelectric devices 20 having separate frequencies $F_1$ to $F_{10}$ (and $F_P$ for party identification) are connected to the input of an amplifier 23. Each of the transducers are preferably tuned to generate a relatively narrow band of frequencies, while the amplifier must, of course, pass all of the signal frequencies. The amplifier may also, with proper switching, be employed in a dual role; that is, it may be used in voice communicating circuits of the subset after signaling is completed. The output of amplifier 23 is coupled through the hookswitch 24 to the subscriber line 25 and to the central office 26 where the signals are sensed by the signal receiver SR and utilized to complete telephone calls and provide party identification. Signal receiver SR converts the tone burst signals to corresponding other signals, for example steady state signals.

Referring to FIGS. 1 to 5, it is evident that a subscriber should tap the push buttons 14 in order to in some way deform the piezoelectric transducers and induce shock excitation therein. Referring again to FIG. 1, tapping of push button 14 compresses spring 18 and forces the end section of its elongated portion 17 to bend the cantilever mounted transducer 20. The broken lines indicate transducer deformation. The following table describes piezoelectric materials and test data for an experimental model of a transducer operating in this mode, the flexure mode.

| Material | Length (cm.) | Thickness (cm.) | Resonant Frequency (c.p.s.) |
|---|---|---|---|
| Barium Titanate | 2.66 | 0.132 | 1000 |
| | 1.87 | 0.066 | 1000 |
| | 1.54 | 0.132 | 3000 |
| | 1.08 | 0.066 | 3000 |
| Lead Zirconate Titanate | 2.66 | 0.132 | 1000 |
| | 1.87 | 0.066 | 1000 |
| | 1.54 | 0.132 | 3000 |
| | 1.08 | 0.066 | 3000 |

The above operational description also holds true for a tapping manipulation of push button 14 in FIGURES 3, 4 and 5; FIG. 4 showing the shear mode of operation, and FIGS. 3 and 5 describing the expander mode of operation. However, there is relatively no movement of the push button of FIG. 5. Push button 14 in this figure is a resilient material, say some type of plastic material, which transmits the shock wave due to tapping therethrough to compress transducer 20. This type of push button dial assembly, as can be seen by comparison with FIGS. 2, 3 and 4, will lend itself to smaller subset design as is now becoming ever more popular.

The operation of the apparatus shown in FIG. 6 can be easily understood. The hookswitch plunger 13 is normally held down by the handset 12 in the on hook condition compressing spring 18'. When the handset is removed spring 18 forces the hookswitch plunger up and its portion 13' applies a hammer like blow to transducer 20.

The above description has been given by way of illustrative examples and should not limit the scope of the invention.

The arrangement shown herein may be modified to employ less piezoelectric elements if a mechanical cross point operating arrangement is used for the push button dial. Furthermore, stacked transducers may be employed for multifrequency signaling. In that event it would be necessary to provide at the central office a multifrequency signal receiver such as the one described in the article "Signaling System and Receiver for 'Touch-Tone' Calling," published as conference paper number CP 62–226 by the American Institute of Electrical Engineers, January 1962. It may also be advantageous to employ the novel signaling arrangement herein in conjunction with a modulator circuit for signaling in carrier systems.

Many other changes and modifications of the invention may be made by one skilled in the art without departing from the spirit and scope of the invention and should be included in the appended claims.

What is claimed is:

1. A telephone subset comprising a handset, a housing having a cradle for receiving said handset, piezoelectric transducer means in said housing for generating a signal tone in response to a mechanical shock, and means in said housing for mechanically shocking said transducer means, said shocking means comprising plunger means extending through said cradle, said handset urging said plunger away from said transducer means and spring means urging said plunger means toward said handset when said handset is on said cradle, said spring means causing said plunger means to strike said transducer means when said handset is removed from said cradle.

2. In a telephone system including a subset for generating tone signals, a subscriber line connected at its one end to said subset for transmitting said signals, and a central office having receiver means for utilizing said signals connected to the other end of said subscriber line, said subset comprising:

a handset;
a housing having a cradle for receiving said handset;
a set of piezoelectric transducers in said housing;
a plurality of signaling pushbuttons individually associated with said set of piezoelectric transducers;
means for mounting each of said pushbuttons in juxtaposition to its associated transducer, each said pushbutton upon depression transmitting a mechanical shock to deform the associated piezoelectric transducer, the associated transducer being responsive to said deformations to generate unique electrical tone signals;
an additional piezoelectric transducer in said housing;
means in said housing operated by the removal of said handset from said cradle to strike said additional piezoelectric transducer to generate a party identity tone signal; and
an amplifier including an input connected to each said transducer and an output connected to said subscriber line.

3. A telephone subset comprising: a housing; a plurality of cylindrical piezoelectric transducers; means included in said housing for mounting said transducers, each said transducer being affixed at one of its ends to said mounting means; a lever arm for each said transducer affixed to the other end and substantially normal to the longitudinal axis thereof; a plurality of pushbuttons movably mounted by said mounting means in juxtaposition to said lever arms, each of said pushbuttons being operable upon depression to pivot an associated lever arm and impart a torsional shock to its associated transducer, said associated transducer operated to generate a unique electrical tone signal in response to said shock; and electrical output connections for each said transducer.

4. A telephone subset comprising: a housing; a plurality of piezoelectric transducers; means for mounting said transducers in said housing; a plurality of pushbuttons, each of said pushbuttons mounted adjacent to and normally bearing on a separate transducer and effective upon the receipt of a striking force to transmit a mechanical shock to the associated transducer, the associated transducer operable to generate a unique electrical tone signal in response to the mechanical shock; and electrical output connections for each said transducer.

5. A telephone subset comprising: a housing; a plurality of piezoelectric transducers; mounting means, said mounting means including a surface to which said plurality of transducers are affixed; a plurality of pushbuttons movably mounted by said mounting means, each said pushbutton including a finger portion, a shank portion and an end portion with said end portion being disposed adjacent a separate one of said transducers, and each said pushbutton operated to compress its associated transducer between its end portion and said surface, each said transducer operated to generate a unique tone signal upon compression and electrical output connections for each said transducer.

References Cited by the Examiner

UNITED STATES PATENTS

| | | | |
|---|---|---|---|
| 2,147,710 | 2/1939 | Mallina | 179—90.3 |
| 2,309,703 | 2/1943 | Lovell | 179—90.3 |
| 2,323,719 | 7/1943 | Mallina | 179—90.3 |
| 2,908,762 | 10/1959 | Meacham | 179—17.1 |

KATHLEEN H. CLAFFY, *Primary Examiner.*

J. W. JOHNSON, R. P. TAYLOR, *Assistant Examiners.*